United States Patent [19]

Najjar et al.

[11] Patent Number: 4,705,538

[45] Date of Patent: * Nov. 10, 1987

[54] PARTIAL OXIDATION PROCESS

[75] Inventors: Mitri S. Najjar, Hopewell Junction; Richard V. Kessler, Wappingers Falls, both of N.Y.

[73] Assignee: Texaco Inc., White Plains, N.Y.

[*] Notice: The portion of the term of this patent subsequent to Nov. 10, 2004 has been disclaimed.

[21] Appl. No.: 795,015

[22] Filed: Nov. 4, 1985

[51] Int. Cl.$^4$ ............................................. C10J 3/46
[52] U.S. Cl. ............................... 48/197 R; 48/206; 48/210; 48/DIG. 7; 252/373
[58] Field of Search ............... 48/197 R, 206, 210, 48/DIG. 7; 75/257; 252/373; 44/1 R, 19; 110/342

[56] References Cited

U.S. PATENT DOCUMENTS

| | | | |
|---|---|---|---|
| 1,955,574 | 4/1934 | Benner et al. | 110/342 |
| 4,207,211 | 6/1980 | Russ et al. | 252/373 |
| 4,234,451 | 11/1980 | Jockel et al. | 252/373 |
| 4,277,365 | 7/1981 | Paull et al. | 48/197 R |
| 4,308,808 | 1/1982 | Brown | 48/DIG. 7 |
| 4,322,221 | 3/1982 | Kamody | 48/DIG. 7 |
| 4,323,475 | 4/1982 | Ball et al. | 252/373 |
| 4,367,160 | 1/1983 | Rooks et al. | 252/373 |
| 4,436,531 | 3/1984 | Estabrook | 48/DIG. 7 |
| 4,504,282 | 3/1985 | Smith | 48/197 R |

*Primary Examiner*—David L. Lacey
*Attorney, Agent, or Firm*—Robert A. Kulason; James J. O'Loughlin; Albert Brent

[57] ABSTRACT

An ash fusion temperature increasing agent principally comprising a silicon and/or titanium compound, such as $SiO_2$ and/or $TiO_2$ is mixed with an ash-containing fuel comprising a pumpable liquid hydrocarbonaceous material and/or petroleum coke to produce Mixture A. In one embodiment, the ash fusion temperature increasing agent comprises about 55-100 wt. % of silicon compound selected from the group consisting of fine silica or quartz, volcanic ash, and mixtures thereof; and the remainder, if any, of said ash fusion temperature increasing agent comprises a member of the group consisting of aluminum compound such as $Al_2O_3$, magnesium compound such as MgO, and mixtures thereof. Mixture A is reacted with a free-oxygen containing gas in a free-flow refractory lined reaction zone of a partial oxidation gas generator. A hot raw effluent gas stream comprising $H_2+CO$ along with fly-ash having an increased initial deformation temperature are produced at a higher temperature. Alternatively, Mixture A may be first introduced into a coking zone and converted into petroleum coke in which the ash fusion temperature increasing agent is dispersed throughout. The petroleum coke entrained in a liquid or gaseous carrier is then introduced into the partial oxidation gas generator where a hot raw effluent gas stream comprising $H_2+CO$ is produced along with fly-ash having an increased ash fusion temperature. The fly-ash is readily separated from the effluent gas stream; and, the gas generator may be operated in the fly-ash mode at a higher temperature, thereby yielding higher carbon conversions while extending the life of the refractory lined reaction zone.

26 Claims, No Drawings

PARTIAL OXIDATION PROCESS

FIELD OF THE INVENTION

This invention relates to the partial oxidation of ash-containing liquid hydrocarbonaceous materials, ash-containing petroleum coke, or both to produce gaseous mixtures comprising $H_2+CO$. More particularly it pertains to the partial oxidation of ash-containing fuel comprising a liquid hydrocarbonaceous material, petroleum coke or both to produce synthesis gas along with fly-ash having an increased ash fusion temperature.

BACKGROUND OF THE INVENTION

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of feed crude. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and legislation (primarily Canadian) requiring total use of feed crude should bring about a greater utilization of petroleum coke feeds to the partial oxidation gas generator.

Previous gasification runs with delayed coke gave rise to some unexpected operating problems. The ash, which normally melts and is discharged from the gasifier as a slag, was not melting completely and being discharged from the gasifier as a slag, but was building up on the walls of the refractory. The use of fluxing additives normally used for coal operations did not alleviate the problem. By the subject invention, the ash from the liquid hydrocarbonaceous fuel and/or solid carbonaceous fuel is combined with an ash fusion temperature increasing agent and the total ash produced from this combination of materials is easily removed from the partial oxidation reaction zone as fly-ash at a higher temperature.

SUMMARY OF THE INVENTION

In accordance with the invention there is provided a process for the production of gaseous mixtures comprising $H_2+CO$ comprising: (1) mixing together (i) an ash fusion temperature increasing agent principally comprising about 55-100 wt. %, say about 80-100 wt. %, and preferably 100 wt. % of a material selected from the group consisting of silicon compound, titanium compound, and mixtures thereof and the remainder of said agent, if any, comprising a material selected from the group consisting of aluminum compound such as $Al_2O_3$, magnesium compound such as MgO, and mixtures thereof, with (ii) ash-containing fuel comprising a liquid hydrocarbonaceous material and/or ash-containing petroleum coke; wherein the particle size of said mixture is preferably such that substantially all of the material passes through a sieve of the size in the range of ASTM E11 Standard Sieve Designation 425 $\mu m$ (microns) to 38 $\mu m$ (microns), or below, and the weight ratio of said ash fusion temperature increasing agent to ash in said ash-containing fuel is in the range of about 0.5-10; (2) reacting said mixture from (1) at a temperature in the range of about 2100° F. to 2700° F. and a pressure in the range of about 1 to 200 atmospheres in a free-flow partial oxidation reaction zone with a free oxygen containing gas in the presence of a temperature moderator to produce a hot raw effluent gas stream comprising $H_2+CO$ along with fly-ash having an increased ash fusion temperature; and (3) separating said fly ash from said hot raw effluent gas stream. In another embodiment of the invention, the comminuted ash fusion temperature increasing agent is mixed with an ash-containing heavy liquid hydrocarbonaceous material and coked. The resulting ash-containing petroleum coke containing dispersed throughout said ash fusion temperature reducing agent is then introduced into the partial oxidation reaction zone in (2) above. By the subject process, the initial ash fusion temperature for the ash derived from the partial oxidation of the ash-containing liquid hydrocarbonaceous material and/or ash-containing petroleum coke may be increased in the range of about 100° F. to 1200° F., such as about 400° F. to 900° F. Partial oxidation gas generators may now be run in the fly-ash mode at higher temperatures. Higher operation temperatures in the fly-ash mode will yield higher carbon conversions and a more environmentally acceptable fly-ash operation. Further, by eliminating molten slag, the life of the refractory lining of the reaction zone is extended at a great cost savings, and plugging of the gasifier may be avoided.

DESCRIPTION OF THE INVENTION

Closer study of the ash derived from the partial oxidation of liquid hydrocarbonaceous fuels and/or petroleum coke shows that they are largely composed of oxide and sulfide compounds of vanadium, nickel, iron, along with some normally occurring mineral matter species similar to that found in coal mineral matter. The metals present in the ash provide a system that is significantly different from that occurring in coal. A further factor is that the total ash content of the petroleum coke may only be about one half to 5 weight percent, whereas coal typically contains 10-20 weight percent ash. The comparatively low ash concentration in petroleum coke apparently is the reason that the ash removal problem is only noticed after prolonged gasifier runs. The chance for effective ash/additive mixing that is necessary to achieve ash fusion temperature modification is therefore greatly reduced. Moreover, it is theorized that in the liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof contined in an organic framework), are entrapped within the collapsed carbon matrix. This invention provides an improved ash fusion temperature increasing agent. Further, a means of introducing this agent into the system to give maximum effectiveness is provided.

By definition, the term ash-containing liquid hydrocarbonaceous material or fuel is a petroleum or coal derived fuel selected from the group consisting of virgin crude, reduced crude, vacuum tower bottoms or feeds, residual fuel oil, decanted oil from a catalytic cracker, heavy fuel oil slurry, heavy gas oils, asphalt, tar sands bitumen, shale oil, coal derived oil, and mixtures thereof.

A preferred embodiment of the subject invention involves mixing the improved comminuted ash fusion temperature increasing agent with ash-containing liquid hydrocarbonaceous fuel, or comminuted ash-containing petroleum coke, or both and introducing the mixture into the partial oxidation gasifier. In another embodiment the comminuted ash fusion temperature increasing agent is mixed with the liquid hydrocarbonaceous material and first fed into a coker. By this means, the finely ground agent may be intimately mixed throughout the petroleum coke product. The petroleum coke contains uniformly dispersed therein sufficient ash fusion temperature increasing agent to provide a weight ratio of ash fusion temperature increasing agent to the ash in the ash-containing fuel in the range of about 0.5 to 10.0. The preferable particle size of the mixture or comminuted ash fusion temperature increasing agent, the comminuted petroleum coke, and mixtures thereof is such that substantially all e.g. about 95 wt. % or more of the material passes through a sieve of the size in the range of ASTM E-11 Standard Sieve Designation about 425 $\mu$m to 38 $\mu$m, or below. In another embodiment, the ash-containing petroleum coke is ground together with the ash fusion temperature increasing agent. Intimate mixing of the materials is thereby achieved, and the particle sizes of each material are substantially the same. The ground mixture is then mixed with water or a liquid hydrocarbonaceous material or both to produce a pumpable slurry. Alternatively, the solid materials may be wet ground with the liquid slurry medium. This slurry is then introduced into a partial oxidation gasifier. The mixture of ash fusion increasing agent and ash-containing fuel is introduced into the free-flow partial oxidation zone and reacted at a temperature in the range of about 1900° F. to 2700° F. and a pressure in the range of about 1 to 200 atmospheres with a free-oxygen containing gas in the presence of a temperature moderator to produce a hot raw effluent gas stream comprising $H_2+CO$ e.g. synthesis gas along with fly-ash having an increased initial deformation temperature in comparison with that of the fly-ash produced by the partial oxidation of the ash-containing fuel without being mixed with ash-fusion temperature increasing agent. Preferably, the comminuted mixture of ash fusion increasing agent and ash-containing fuel is introduced into the gasifier as a pumpable slurry including water or liquid hydrocarbonaceous fluid, or mixtures thereof. The solids content of the slurry is in the range of about 50–68 weight percent. Alternatively, the mixture may be entrained in a gaseous transport medium. The gaseous transport medium may be selected from the group consisting of steam, $CO_2$, $N_2$, free-oxygen containing gas, and recycle synthesis gas.

In the embodiment where the ash fusion temperature increasing agent is mixed with the liquid hydrocarbonaceous material and fed into a coker, the actual operation can be accomplished for example by mixing the agent into the ash-containing petroleum liquid feed to the vacuum distillation tower, which normally precedes the coker unit. In either unit operation (coking or distillation), the agent should predominately stay behind in the desired bottoms stream. In other words, there should be little, if any, carry over of agent with the lighter products. A possible advantage for mixing the bottoms stream (i.e. coker feed) is that the feed to the vacuum tower is significantly less viscous than the bottoms from the vacuum tower. A more thorough mixing may be thereby effected.

In one embodiment a mixture of high boiling liquid petroleum i.e. liquid hydrocarbonaceous fuel and comminuted coke ash fusion temperature increasing agent at a temperature in the range of about 650° F. to 930° F. is introduced into a delayed coking zone, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke is removed from the bottom of said delayed coking zone. Alternatively, the mixture of high boiling liquid petroleum and comminuted coke ash fusion temperature increasing agent at a temperature in the range of about 550° F. to 750° F. may be introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 paig, uncondensed hydrocarbon effluent vapor and steam are removed overhead and said petroleum coke is removed from the bottom of said coking zone.

By definition, ash from liquid hydrocarbonaceous material or petroleum coke ash comprises mostly the oxides and possibly the sulfides of Ni, V, Fe, Al and Ca along with the oxides of Si and a minor amount of the oxides selected from the group consisting of Ti, Cr, and mixtures thereof. While the metal concentrations in the liquid hydrocarbonaceous material may comprise Ni 0.5 to 610 ppm (parts per million), V 2.0–1500 ppm, Fe 0.5 to 750 ppm, along with Si, Al and Ca 0.5 to 750 ppm each; the metal concentrations in the petroleum coke product may comprise Ni 2.0 to 3100 ppm, v 8.0 to 7400 ppm, Fe 2.0 to 380 ppm, and Si, Al and Ca 2.0 ppm or more. For example, the silicon content of petroleum coke made from syncrude derived from heavy oil sands may be greater than 7,000 ppm.

Another aspect of this invention is that the ash fusion modifying agent involved may be selected on the basis of serendipitous catalytic properties in addition to the agent's primary function of ash fusion modification. The agent may act to produce more and/or a better quality light products from the coker operation. The expression "and/or" as used in the subject application means either one or both of the items or materials specified. The ash fusion modifying agent may also aid in the gasification reactions either by increasing the reaction rate and thus the throughput capacity of the gasifier, or by increasing the conversion of the soot and thus the overall efficiency of the process. Again, however, this invention does not depend on the catalytic properties of the agent.

It was unexpectedly found that a preferred ash fusion temperature increasing agent for mixing with the ash-containing fuel comprising liquid hydrocarbonaceous material and/or petroleum coke comprises a comminuted material selected from the group consisting of silicon compound, titanium compound, and mixtures thereof. In another embodiment, the silicon and/or titanium compounds are in admixture with about 0 to 45 wt. %, say about 0 to 20 wt. %, and preferably 0 wt. %, of a material selected from the group consisting of aluminum compound, magnesium compound, and mixtures thereof.

Thus, the comminuted ash fusion temperature increasing agent principally comprises about 55.0–100 wt. %, such as about 80–100 wt. %, and preferably 100 wt. % of a silicon and/or titanium compound; and the remainder, if any, of the ash fusion temperature increasing agent comprises a material selected from the group consisting of aluminum compound, magnesium compound, and mixtures thereof. Regarding the respective amounts of silicon and titanium compounds, there may be about 0 to 100 wt. %, such as about 25 to 75 wt. %, and preferably 100 wt. % of a silicon compound e.g. $SiO_2$, and the remainder, if any, may comprise a titanium compound e.g. $TiO_2$. Regarding the respective amounts of aluminum compound and magnesium compound, if present, there may be about 0 to 100 wt. %, such as about 25 to 75 wt. %, and preferably 100 wt. % of an aluminum compound e.g. $Al_2O_3$, and the remainder, if any may comprise a magnesium compound e.g. MgO. The silicon compound may be selected from the group consisting of fine silica or quartz, volcanic ash, and mixtures thereof. $SiO_2$ is preferred. The titanium compound may be selected from the group consisting of an oxide, nitride, sulfate, and mixtures thereof. The aluminum compound may be selected from the group consisting of oxide, acetate, hydroxide, naphthenate, sulfate, silicate, nitrate, and mixtures thereof. The preferred aluminum compound is aluminum oxide ($Al_2O_3$). The magnesium compound may be selected from the group consisting of oxide, acetate, aluminate, carbonate, nitrate, oxalate, phosphate, sulfide, sulfate, and mixtures thereof. The preferred magnesium compound is magnesium oxide (MgO). The particle size of said coke ash fusion temperature mixture is such that preferably substantially all e.g. about 95 weight percent, or more of the material passes through a sieve of the size in the range of ASTM E-11 Standard Sieve Designation 425 $\mu$m to 38 $\mu$m, or below.

The weight ratio of ash fusion temperature increasing agent to ash in the ash-containing fuel comprising liquid hydrocarbonaceous material and/or petroleum coke is in the range of about 0.5 to 10, such as about 4 to 6. In the aforesaid ratio, the ash-containing fuel to be analyzed for ash is ashed under standard conditions and ignited to constant weight e.g. American Society For Testing and Materials (ASTM) D482 and D3686.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures will produce the same gasification problems as discussed for coke. Thus, the invention of introducing an ash fusion temperature reducing agent as part of the petroleum processing prior to gasification should, depending on the specific process, produce a gasified feed that will be free of the gasification problems mentioned above. Most of these processes employ vacuum distillation as pretreatment. Accordingly, as described above, the ash fusion temperature reducing agent may be mixed into the vacuum distillation feed. The agent then will emerge from the distillation in the bottoms stream. In turn the bottoms stream is the feed stream for the upgrading process. This incorporation of the agent should not adversely affect these processes, and the agent should ultimately emerge with the residue stream from each respective process. In all of these processes, this residue stream should be suitable for gasification by partial oxidation.

The ash-containing fuel and ash fusion temperature increasing agent are reacted with a free-oxygen containing gas e.g. air, oxygen-enriched air, substantially pure oxygen, in the presence of a temperature moderator e.g. $H_2$, $CO_2$, $N_2$, in the refractory lined partial oxidation synthesis gas generation zone at an autogenous temperature in the range of about 2100° F. to 2700° F., such as about 2150° F. to 2400° F., and a pressure in the range of about 1 to 200 atmospheres, such as about 6 to 60 atmospheres. The fly-ash is readily separated from the hot effluent gas stream leaving the reaction zone by quenching and/or scrubbing the gas stream with water or other gas scrubbing medium. By this means, synthesis gas substantially comprising in mole % dry basis $H_2$ 25 to 45, CO 20 to 50, $CO_2$ 5 to 35, $CH_4$ 0.06 to 8.0, and $CO_2$ + $H_2S$ 0.1 to 2.0 may be produced in a free-flow partial oxidation reaction zone, such as that shown and described in coassigned U.S. Pat. No. 3,607,157, which is incorporated herein by reference. The fly-ash entrained in the hot raw effluent gas stream comprising $H_2$+CO has an initial ash deformation temperature of at least 1500° F., such as in the range of about 1900° F. to 2700° F., such as about 2150° F. to 2400° F. This is an increase in the range of about 400° F. to 1200° F. in comparison with the initial deformation temperature of the fly-ash produced by the partial oxidation of the ash-containing fuel without admixture with ash-fusion temperature increasing agent.

In the fly-ash mode, the ash is maintained as a solid, hopefully in a well dispersed (i.e. non-agglomerated) form. Thus, it is discharged from the gasifier as a dusty powder well mixed in the product gases. A major problem encountered when running in the fly-ash mode is when a discrete portion of the ash from the ash-containing fuel is a low melting species. Thus, even when operating at a minimum viable gasification temperature (for feed conversion sake), this discrete portion of ash may still melt, forming liquid droplets in the system that may cause agglomeration of the non-molten ash particles. In other words, the melt acts as a glue to bind ash particles together and against the inner surfaces of the gasifier. If the gasifier is run long enough, this situation typically results in a blockage large enough to disrupt normal operations and ultimately to cause a premature shut down of the system. The coke ash produced in a partial oxidation gasifier being operated in the fly-ash mode would be a type of ash that would cause this problem. This is indicated by the ASTM Test for Fusibility of Coal and Coke Ash (D1857) results (see Table II). As shown, the fly-ash produced from one type of delayed petroleum coke feedstock undergoes a change at a relatively low temperature

TABLE II

| Delayed Coke Fly-Ash Fusibility Points (from ASTM Test D1857) | |
|---|---|
| Temperature | °F. |
| Initial Deformation | 1515 |
| Softening | 2630 |
| Hemispherical | 2650 |
| Fluid | 2700+ | of 1515° F. (the initial deformation temperature) indicating the presence of low melting components. However, the fly-ash never becomes completely molten (i.e. reaches the fluid temperature) up to the test limit of 2700° F. During a fly-ash mode operation, it is the low melting components that must be scavenged by the ash fusion temperature increasing additive. The following characteristics of the subject ash-fusion temperature increasing agent have made it successful for this purpose:

(1) high melting point,
(2) the compounds formed when the additive and low melting species of ash-containing fuel interact must also be high melting substances, and
(3) a large surface area is provided for deposition of the molten species e.g. high specific surface area ea 1.6 m$^2$/gm.

This last criteria e.g. (3) may be improved by fine grinding the additive, as described previously. While grinding is desireable for good dispersing, it primarily pertains to the inherent surface area provided by the crystalline structure of the additive. This means that the interior surface areas are present as walls of the pore lattice in the crystal. These pores are very important for the capture of the ash species released as individual molecules. These species, not seen or expected to be generated by the ash fusibility test, could give rise to another liquid phase in the system that could cause agglomeration. Moreover, these species would be the hardest to capture because of their size and dispersion.

Advantages of the present invention are illustrated by the following specific examples. These examples are set forth for purpose of illustration and should not be construed as limiting the invention.

EXAMPLE 1

Run No. 1—The initial deformation temperature of fly-ash produced by the partial oxidation of a typical petroleum coke and referred to hereafter as "coke fly-ash" was determined to be 1700° F. when tested according to ASTM Test Method D-1857. The petroleum coke feed to the partial oxidation gas generator was derived from the delayed coking of heavy crude. The particle size of the ash-containing petroleum coke feed to the gas generator was such that substantially all of the material passed through a sieve of the size in the range of ASTM E-11 Standard Sieve Designation 425 μm to 38 μm, or below. The ash content of the petroleum coke was 0.4 wt. %.

Run No. 2—Various other materials were prepared and tested for initial deformation temperature, including 100 wt. % $SiO_2$, $TiO_2$, alumina, magnesia, and mixtures comprising 1 part by weight of $SiO_2$ or $TiO_2$ additive for each part by weight petroleum coke ash.

The data show that the initial deformation temperature of coke fly-ash from the gasifier of 1700° F. is dramatically increased by about 1000° F. to an initial deformation temperature of greater than 2700° F. by the addition of the subject petroleum coke ash fusion temperatures increasing agent to the feed to the gasifier. This indicates that this additive effectively ties up the low melting species in the coke ash. Further, the initial deformation temperature for the $SiO_2$ and $TiO_2$ with or without admixture with magnesia and/or alumina were all greater than 2700° F.

Accordingly, when the subject ash fusion reducing mixtures are introduced into a partial oxidation gas generator in admixture with the ash-containing coke feed, gaseous mixtures comprising $H_2+CO$ and containing fly-ash having an increased ash fusion temperature are produced. The gas generator may not be run in the fly-ash mode at higher temperatures. More carbon is converted; and because of the absence of molten slag, the life of the refractory lining of the reaction zone is extended at a substantial cost savings. The subject ash fusion temperature increasing mixture has a minimal interaction with the liner during shut down where the partial pressure of oxygen if high.

Although modifications and variations of the invention may be made without departing from the spirit and scope thereof, only such limitations should be imposed as are indicated in the appended claims.

We claim:

1. A process for the production of gaseous mixtures comprising $H_2+CO$ comprising:
   (1) mixing together (i) an ash fusion temperature increasing agent comprising a comminuted material selected from the group consisting of silicon compound, titanium compound, and mixtures thereof with (ii) and ash-containing fuel feedstock comprising a liquid hydrocarbonaceous material and/or ash-containing petroleum coke, wherein the ash in said feedstock includes vanadium, and wherein the weight ratio of said ash fusion temperature increasing agent to the ash in said ash-containing fuel is in the range of about 0.5 to 10;
   (2) reacting said mixture from step (1) in a free-flow partial oxidation reaction zone at a temperature in the range of about 2100° F. to 2700° F. and a pressure in the range of about 1 to 200 atmospheres with a free-oxygen containing gas in the presence of a temperature moderator to produce a hot raw effluent gas stream comprising $H_2+CO$ along with fly-ash having an increased initial deformation temperature; and
   (3) separating said fly-ash from said hot raw effluent gas stream.

2. The process of claim 1 wherein said ash fusing temperature increasing agent comprises a compound of silicon and a compound of titanium and said silicon compound in $SiO_2$ and said titanium compound in $TiO_2$.

3. The process of claim 1 wherein said ash fusion temperature increasing agent comprises at least one silicon compound selected from the group consisting of fine silica or quartz, volcanic ash, and mixtures thereof.

4. The process of claim 1 wherein the ash fusion temperature increasing agent comprises about 55 to 100 wt. % of said material selected from the group consisting of silicon compound, titanium compound, and mixtures thereof and any remainder of said ash fusion temperature increasing agent, is a material selected from the group consisting of aluminum compound, magnesium compound, and mixtures thereof.

5. The process of claim 4 wherein said remainder of ash fusing temperature increasing agent is an aluminum compound which comprises aluminum in combination with a member selected from the group consisting of oxide, acetate, hydroxide, naphthenate, sulfate, silicate, nitrate, and mixtures thereof; and a magnesium compound, said magnesium compound comprises magnesium in combination with a member selected from the group consisting of oxide, acetate, aluminate, carbonate, nitrate, oxalate, phosphate, sulfide, sulfate, and mixtures thereof.

6. The process of claim 1 wherein the mixture of ash fusion temperature increasing agent and ash-containing fuel from step (1) is introduced into the free-flow partial oxidation zone in step (2) as a pumpable slurry including water or liquid hydrocarbonaceous fuel or mixtures thereof.

7. The process of claim 1 wherein in step (1) said ash-fusion temperature increasing agent is introduced into the feed to a vacuum distillation unit.

8. The process of claim 1 wherein said ash-containing liquid hydrocarbonaceous material is selected from the group consisting of virgin crude, reduced crude, residual fuel oil, decanted oil from a catalytic cracker, heavy fuel oil slurry, heavy gas oils, asphalt, tar sands bitumen, shale oil, coal derived oil, and mixtures thereof.

9. The process of claim 1 wherein the mixture of materials from step (1) has a particle size such that substantially all of the material passes through a sieve of the size in the range of ASTM E-11 Standard Sieve Designation 425 $\mu$m to 38 $\mu$m, or below.

10. A process for the production of gaseous mixtures comprising $H_2 + CO$ comprising:
   (1) disseminating a comminuted petroleum coke ash fusion temperature increasing agent comprising a comminuted material selected from the group consisting of silicon compound, titanium compound and mixtures thereof into an ash-containing fuel feedstock comprising a heavy liquid hydrocarbonaceous material so that the weight ratio of said petroleum coke ash fusion temperature increasing agent to ash in said ash-containing fuel is in the range of about 0.5 to 10.0, and wherein the ash in said feedstock includes vanadium;
   (2) coking said mixture of petroleum coke ash fusion temperature increasing agent and ash-containing heavy liquid hydrocarbonaceous material from step (1) to produce petroleum coke containing dispersed therein said petroleum coke ash fusion temperature increasing agent; and
   (3) reacting said petroleum coke from step (2) in a free-flow partial oxidation reaction zone at a temperature in the range of about 2100° F. to 2700° F. and a pressure in the range of about 1 to 200 atmospheres with a free-oxygen containing gas in the presence of a temperature moderator to produce a hot raw effluent gas stream comprising $H_2 + CO$ along with fly-ash having an increased initial deformation temperature.

11. The process of claim 10 wherein said ash fusing temperature increasing agent comprises a compound of silicon and a compound of titanium and said silicon compound is $SiO_2$ and said titanium compound is $TiO_2$.

12. The process of claim 10 wherein the ash fusion temperature increasing agent comprises about 55 to 100 wt. % of said material selected from the group consisting of silicon compound, titanium compound, and mixtures thereof and any remainder of said ash fusion temperature increasing agent is a material selected from the group consisting of aluminum compound, magnesium compound, and mixtures thereof.

13. The process of claim 12 wherein said remainder of ash fusing temperature increasing agent is an aluminum compound which comprises aluminum in combination with a member selected from the group consisting of oxide, acetate, hydroxide, naphthenate, sulfate, silicate, nitrate, and mixtures thereof; and a magnesium compound, said magnesium compound comprises magnesium in combination with a member selected from the group consisting of oxide, acetate, aluminate, carbonate, nitrate, oxalate, phosphate, sulfide, sulfate, and mixtures thereof.

14. The process of claim 10 wherein said ash fusion temperature increasing agent comprises at least one silicon compound selected from the group consisting of fine silica or quartz, volcanic ash, and mixtures thereof.

15. The process of claim 10, wherein said petroleum coke ash fusion temperature increasing agent has a particle size such that substantially all of the material passes through a sieve of the size in the range of ASTM E-11 Standard Sieve Designation 425 $\mu$m to 38 $\mu$m, or below.

16. The process of claim 10 wherein the weight ratio of petroleum coke ash fusion temperature increasing agent in step (1) to ash in said ash-containing fuel in step (1) is in the range of about 1 to 3.

17. The process of claim 10 wherein said ash-containing heavy liquid hydrocarbonaceous fuel is a high boiling liquid petroleum feed to or the bottoms from a vacuum tower or a fractionator.

18. The process of claim 10 provided with the step of separating said fly-ash from the hot raw effluent gas stream.

19. The process of claim 10 wherein the petroleum coke from step (2) is introduced into the free-flow partial oxidation zone in step (3) as a pumpable slurry of petroleum coke in water, liquid hydrocarbonaceous fluid or mixtures thereof, or as substantially dry petroleum coke entrained in a gaseous transport medium.

20. A process for the production of gaseous mixtures comprising $H_2 + CO$ comprising:
   (1) mixing together (i) a comminuted ash fusion temperature increasing agent having a particle size such that substantially all of the material passes through a sieve of the size in the range of ASTM E-11 Standard Sieve Designation 425 $\mu$m to 38 $\mu$m, or below and which comprises about 55 to 100 wt. % of a silicon and/or titanium compound and any remainder of said ash fusion temperature increasing agent comprising a material selected from the group consisting of aluminum compound, magnesium compound, and mixtures thereof, with (ii) an ash-containing fuel feedstock comprising a high boiling liquid petroleum taken from the bottom of a vacuum tower or a fractionator, or with an ash-containing petroleum liquid feedstock to said vacuum tower or fractionator; wherein the weight ratio of said ash fusion temperature increasing agent to the ash in said ash-containing fuel is in the range of about 0.5 to 10.0, and wherein the ash in said feedstock includes vanadium;

(2) introducing the mixture of ash-containing high boiling liquid petroleum and comminuted petroleum coke ash fusion temperature increasing agent from step (1) at an elevated temperature into a coking zone and removing therefrom petroleum coke containing uniformly dispersed therein petroleum coke ash fusion temperature increasing agent;

(3) reacting said petroleum coke from step (2) in a free flow partial oxidation reaction zone at a temperature in the range of about 2100° F. to 2700° F. and a pressure in the range of about 1 to 200 atmospheres with a free-oxygen containing gas in the presence of a temperature moderator to produce a hot raw effluent gas stream comprising $H_2+CO$ along with fly-ash having an increased initial deformation temperature; and (4) separating said fly-ash from said hot raw effluent gas stream.

21. The process of claim 20 wherein and said ash fusing temperature increasing agent comprises a compound of silicon and a compound of titanium and said silicon compound is $SiO_2$ and said titanium compound is $TiO_2$.

22. The process of claim 20 wherein said ash fusing temperature increasing agent comprises a silicon compound and said silicon compound is selected from the group consisting of fine silica or quartz, volcanic ash, and mixtures thereof.

23. The process of claim 20 wherein said remainder of ash fusing temperatue increasing agent is an aluninum compound which comprises in combination with a member selected from the group consisting of oxide, acetate, hydroxide, naphthenate, sulfate, silicate, nitrate, and mixtures thereof; and a magnesium compound said magnesium compound comprises magnesium in combination with a member selected from the group consisting of oxide, acetate, aluminate, carbonate, nitrate, oxalate, phosphate, sulfide, sulfate, and mixtures thereof.

24. The process of claim 23 where in step (2) the mixture of ash-containing high boiling liquid petroleum and comminuted coke ash fusion temperature increasing agent at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead and said petroleum coke is removed from the bottom.

25. The process of claim 20 where in step (2) the mixture of ash-containing high boiling liquid petroleum and comminuted coke ash fusion temperature increasing agent at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

26. The process of claim 20 provided with the step of separating said petroleum coke ash from said hot effluent gas stream from step (4) with a water or oil scrubbing medium.

* * * * *